US011978393B1

(12) United States Patent
Huang

(10) Patent No.: US 11,978,393 B1
(45) Date of Patent: May 7, 2024

(54) PIXEL CIRCUIT AND OPERATION METHOD THEREOF

(71) Applicant: NOVATEK Microelectronics Corp., Hsinchu (TW)

(72) Inventor: Shing-Ron Huang, Tainan (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 0 days.

(21) Appl. No.: 18/325,014

(22) Filed: May 29, 2023

(51) Int. Cl.
*G09G 3/32* (2016.01)

(52) U.S. Cl.
CPC ....... *G09G 3/32* (2013.01); *G09G 2300/0819* (2013.01); *G09G 2300/0852* (2013.01); *G09G 2310/061* (2013.01); *G09G 2310/08* (2013.01)

(58) Field of Classification Search
CPC ............. G09G 3/32; G09G 2300/0819; G09G 2300/0852; G09G 2310/061; G09G 2310/08
See application file for complete search history.

(56) References Cited

U.S. PATENT DOCUMENTS 7,903,057 B2 3/2011 Uchino et al.
2009/0091562 A1* 4/2009 Uchino ................ G09G 3/3233 345/55
2012/0169798 A1* 7/2012 Ebisuno ................ G09G 3/325 345/77
2013/0321248 A1* 12/2013 Kimura ................ G09G 3/3208 345/76

* cited by examiner

*Primary Examiner* — David Tung
(74) *Attorney, Agent, or Firm* — CKC & Partners Co., LLC

(57) ABSTRACT

A pixel circuit includes a first transistor, a second transistor, a first capacitor, a third transistor, a second capacitor, and a fourth transistor. The first transistor is configured to receive a power voltage. The second transistor is configured to receive a data voltage and is coupled to a gate terminal of the first transistor. The first capacitor is coupled between the gate terminal of the first transistor and a source terminal of the first transistor. The third transistor is coupled between the source terminal of the first transistor and a light-emitting element. The second capacitor is coupled between the source terminal of the first transistor and a reference voltage. The fourth transistor is coupled between the source terminal of the first transistor and a reset voltage.

20 Claims, 6 Drawing Sheets

PIXEL CIRCUIT AND OPERATION METHOD THEREOF

BACKGROUND

Technical Field

The present disclosure relates to pixel technology. More particularly, the present disclosure relates to a pixel circuit with a threshold voltage correction and a mobility correction, and an operation method thereof.

Description of Related Art

With developments of technology, display devices are applied to various electronic devices. In practical applications, a display panel in a display device includes a plurality of pixels. Each pixel includes three sub-pixels (e.g., a red sub-pixel, a green sub-pixel, and a blue sub-pixel), and each sub-pixel is driven by a pixel circuit to emit light. How to make the pixel circuit being more efficient in operation and having better performance in functionality (e.g., to make the sub-pixels more uniform with less current consumption, with a shorter operation cycle, or with an enlarged data range) is one of the important topics in this field.

SUMMARY

Some aspects of the present disclosure are to provide a pixel circuit. The pixel circuit includes a first transistor, a second transistor, a first capacitor, a third transistor, a second capacitor, and a fourth transistor. The first transistor is configured to receive a power voltage. The second transistor is configured to receive a data voltage and is coupled to a gate terminal of the first transistor. The first capacitor is coupled between the gate terminal of the first transistor and a source terminal of the first transistor. The third transistor is coupled between the source terminal of the first transistor and a light-emitting element. The second capacitor is coupled between the source terminal of the first transistor and a reference voltage. The fourth transistor is coupled between the source terminal of the first transistor and a reset voltage.

Some aspects of the present disclosure are to provide an operation method of a pixel circuit. The pixel circuit includes a first transistor, a second transistor, a first capacitor, a third transistor, a second capacitor, and a fourth transistor. The first transistor is configured to receive a power voltage. The second transistor is configured to receive a data voltage and is coupled to a gate terminal of the first transistor. The first capacitor is coupled between the gate terminal of the first transistor and a source terminal of the first transistor. The third transistor is coupled between the source terminal of the first transistor and a light-emitting element. The second capacitor is coupled between the source terminal of the first transistor and a reference voltage. The fourth transistor is coupled between the source terminal of the first transistor and a reset voltage. The operation method includes following operations: in a reset duration, transmitting, by the second transistor, an initial voltage to the gate terminal of the first transistor and transmitting, by the fourth transistor and the third transistor, the reset voltage to an anode terminal of the light-emitting element; in a data write and correction duration, transmitting, by the second transistor, a signal voltage to the gate terminal of the first transistor and turning off the second transistor at a time point before the first transistor enters a cut-off state; and in a light-emitting duration, conducting, by the first transistor and the third transistor, a light-emitting current to the light-emitting element.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
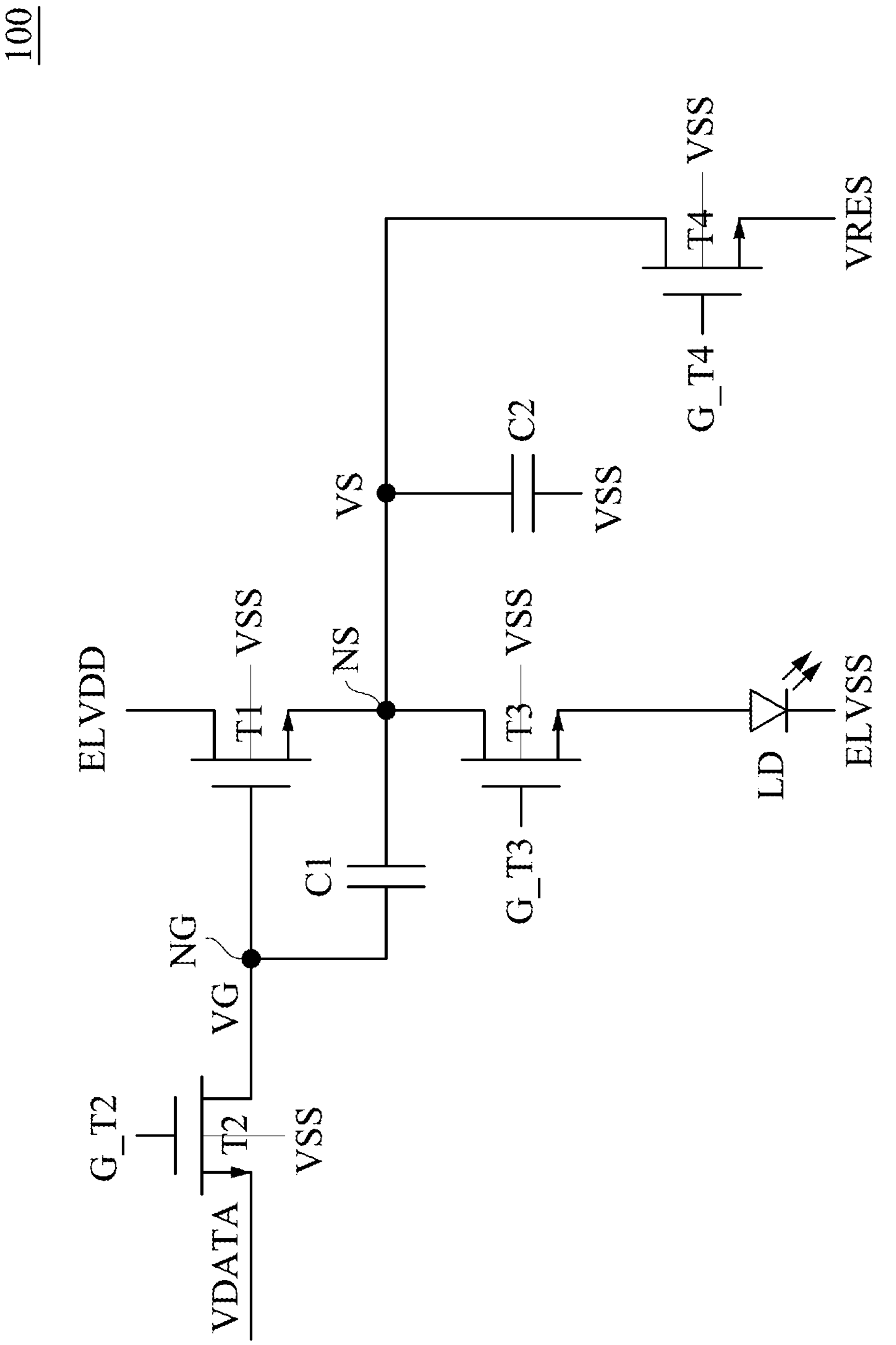
FIG. 1 is a schematic diagram illustrating a pixel circuit according to some embodiments of the present disclosure.

Reference is made to FIG. 1. FIG. 1 is a schematic diagram illustrating a pixel circuit 100 according to some embodiments of the present disclosure.

In general, a display device includes a display panel, a timing controller, a source driver, a gate driver, and other circuits. The display panel includes a plurality of pixels. Each of the pixels includes three sub-pixels (e.g., a red sub-pixel, a green sub-pixel, and a blue sub-pixel). Each sub-pixel can be driven by one pixel circuit 100 in FIG. 1 to emit light, and the pixel circuit 100 can be controlled by the timing controller, the source driver, the gate driver, and the other circuits. In some embodiments, the pixel circuit 100 is produced on the silicon (Si) process.

As illustrated in FIG. 1, the pixel circuit 100 includes a transistor T1, a transistor T2, a transistor T3, a transistor T4, a capacitor C1, a capacitor C2, and a light-emitting element LD.

In some embodiments, the transistor T1, the transistor T2, the transistor T3, and the transistor T4 are implemented by Metal Oxide Semiconductor Field Effect Transistors (MOSFETs) on Si. In the example of FIG. 1, the transistor T1, the transistor T2, the transistor T3, and the transistor T4 are implemented by N-type transistors on Si, but the present disclosure is not limited thereto. Alternatively stated, the structure in the example of FIG. 1 is 4N2C. As shown in FIG. 1, each of the transistor T1, the transistor T2, the transistor T3, and the transistor T4 has four terminals, and the four terminals are a source terminal, a gate terminal, a drain terminal, and a bulk terminal. The bulk terminals contribute body-effect features.

In some embodiments, the ratio of a capacitance value of the capacitor C2 and a capacitance value of the capacitor C1 is greater than a body-effect coefficient of the transistor T1. Regarding to the body-effect coefficient, a threshold voltage of the transistor T1 in a specific duration (phase) has a positive relationship to this body-effect coefficient of the transistor T1.

In some embodiments, the light-emitting element LD is implemented by a Light Emitting Diode on Si (LEDoS) or an Organic Light Emitting Diode on Si (OLEDoS). The light-emitting element LD includes an anode terminal and a cathode terminal. A voltage difference between the anode terminal and the cathode terminal can control the light-emitting element LD to emit light.

The drain terminal of the transistor T1 receives a power voltage ELVDD. In some embodiments, the power voltage ELVDD is a fixed voltage. In other words, in these embodiments, the power voltage ELVDD is not switched (without toggle) between different voltage values. The bulk terminal of the transistor T1 receives a reference voltage VSS. The source terminal of the transistor T2 receives a data voltage VDATA. The drain terminal of the transistor T2 is coupled to the gate terminal of the transistor T1. The gate terminal of the transistor T2 receives a control signal G_T2. The bulk terminal of the transistor T2 receives the reference voltage VSS. The capacitor C1 is coupled between the gate terminal of the transistor T1 (i.e., a node NG) and the source terminal of the transistor T1 (i.e., a node NS). The drain terminal of the transistor T3 is coupled to the source terminal of the transistor T1. The source terminal of the transistor T3 is coupled to the anode terminal of the light-emitting element LD. The cathode terminal of the light-emitting element LD receives a power voltage ELVSS. The gate terminal of the transistor T3 receives a control signal G_T3. The bulk terminal of the transistor T3 receives the reference voltage VSS. The capacitor C2 is coupled between the source terminal of the transistor T1 and the reference voltage VSS. The drain terminal of the transistor T4 is coupled to the source terminal of the transistor T1. The source terminal of the transistor T4 receives a reset voltage VRES. The gate terminal of the transistor T4 receives a control signal G_T4. The bulk terminal of the transistor T4 receives the reference voltage VSS.

Figure 2:
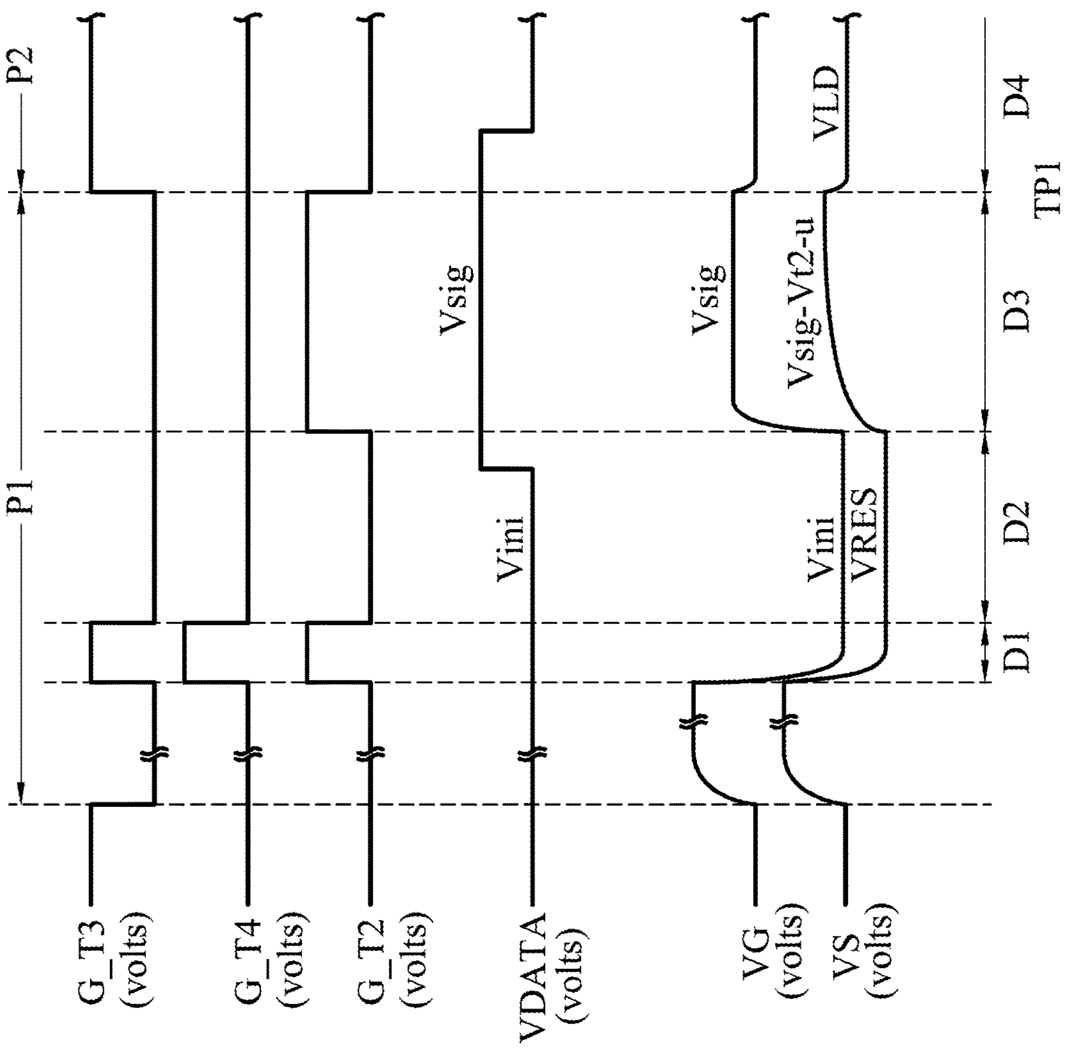
FIG. 2 is a waveform diagram of the pixel circuit in FIG. 1 according to some embodiments of the present disclosure.

Reference is made to FIG. 2. FIG. 2 is a waveform diagram of the pixel circuit 100 in FIG. 1 according to some embodiments of the present disclosure.

As illustrated in FIG. 2, there are a non-light-emitting period P1 and a light-emitting period P2 sequentially. The non-light-emitting period P1 includes a reset duration D1, a multiplex duration D2, and a data write and correction duration D3 sequentially, and the light-emitting period P2 includes a light-emitting duration D4.

Figure 3:
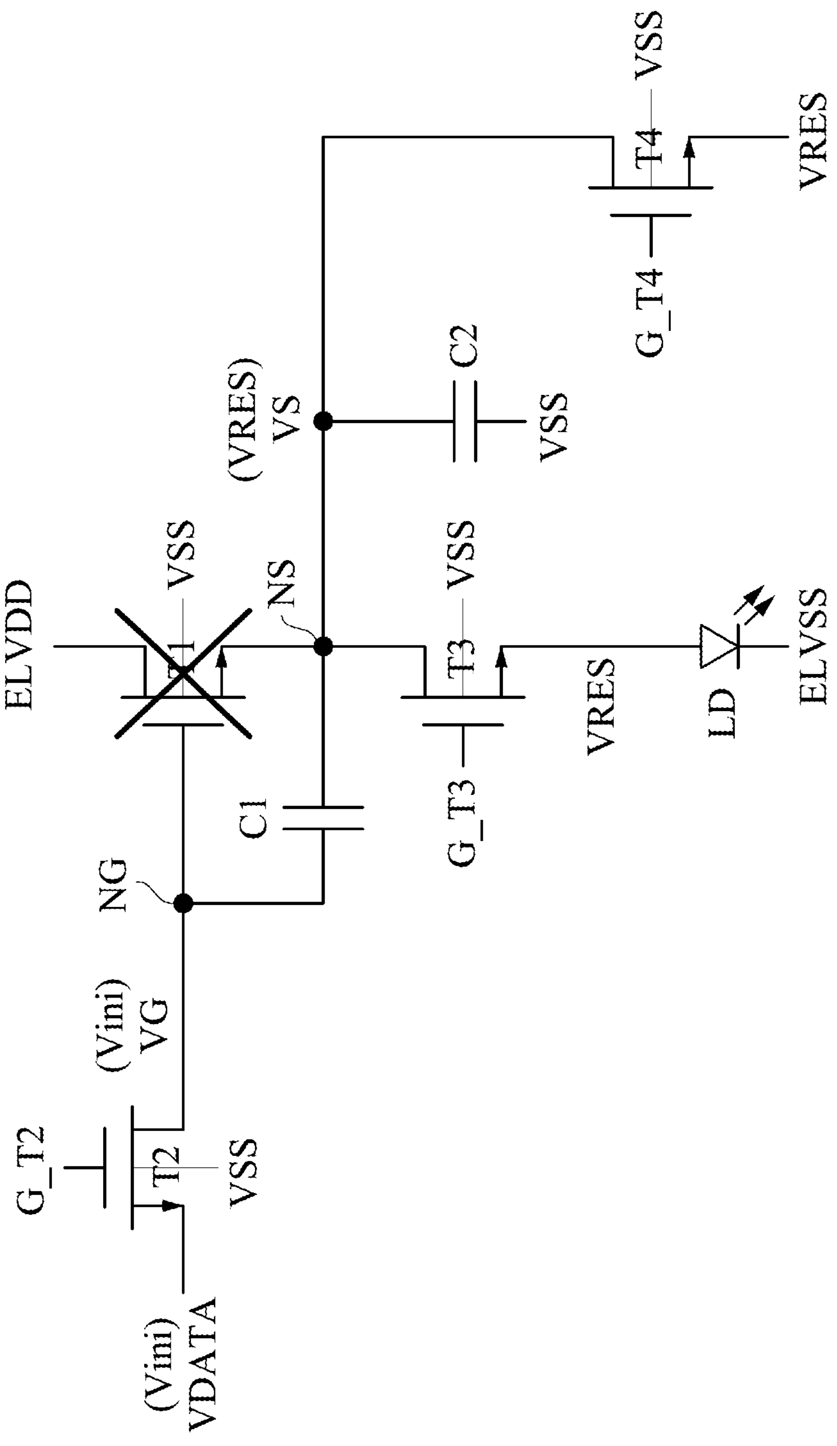
FIG. 3 is a schematic diagram illustrating the pixel circuit in FIG. 1 in a reset duration according to some embodiments of the present disclosure.

References are made to FIG. 2 and FIG. 3. FIG. 3 is a schematic diagram illustrating the pixel circuit 100 in FIG. 1 in the reset duration D1 according to some embodiments of the present disclosure.

As illustrated in FIG. 2 and FIG. 3, in the reset duration D1, the control signal G_T3, the control signal G_T4, and the control signal G_T2 have a high logic value (e.g., a logic value 1). Thus, the transistor T3, the transistor T4, and the transistor T2 are turned on. In addition, the data voltage VDATA has an initial voltage Vini.

As illustrated in FIG. 3, since the transistor T3 and the transistor T4 are turned on, the reset voltage VRES at the source terminal of the transistor T4 is transmitted to the node NS through the turned-on transistor T4 such that a node voltage Vs at the node NS decreases to the reset voltage VRES (as shown in FIG. 2). Then, the reset voltage VRES is transmitted to the anode terminal of the light-emitting element LD through the turned-on transistor T3. In some embodiments, a voltage difference between the reset voltage VRES at the anode terminal of the light-emitting element LD and the power voltage ELVSS at the cathode terminal of the light-emitting element LD is less than a turned-on voltage of the light-emitting element LD to make sure that the light-emitting element LD is turned off and does not emit light in the reset duration D1.

In addition, since the transistor T2 is turned on, the initial voltage Vini is transmitted to the node NG through the turned-on transistor T2 such that a node voltage VG at the node NG decreases to the initial voltage Vini (as shown in FIG. 2). In some embodiments, a voltage difference between the initial voltage Vini at the gate terminal of the transistor T1 and the reset voltage VRES at the source terminal of the transistor T1 is less than a threshold voltage of the transistor T1 in the reset duration D1 to make sure that the transistor T1 is turned off and no current flows from the transistor T1 to the light-emitting element LD in the reset duration D1.

In some embodiments, when the reset duration D1, the data write and correction duration D3, and the light-emitting duration D4 are designed for a red sub-pixel in one pixel, the multiplex duration D2 can be designed for a green sub-pixel and a blue sub-pixel in this pixel to realize a multiplex mechanism.

Figure 4:
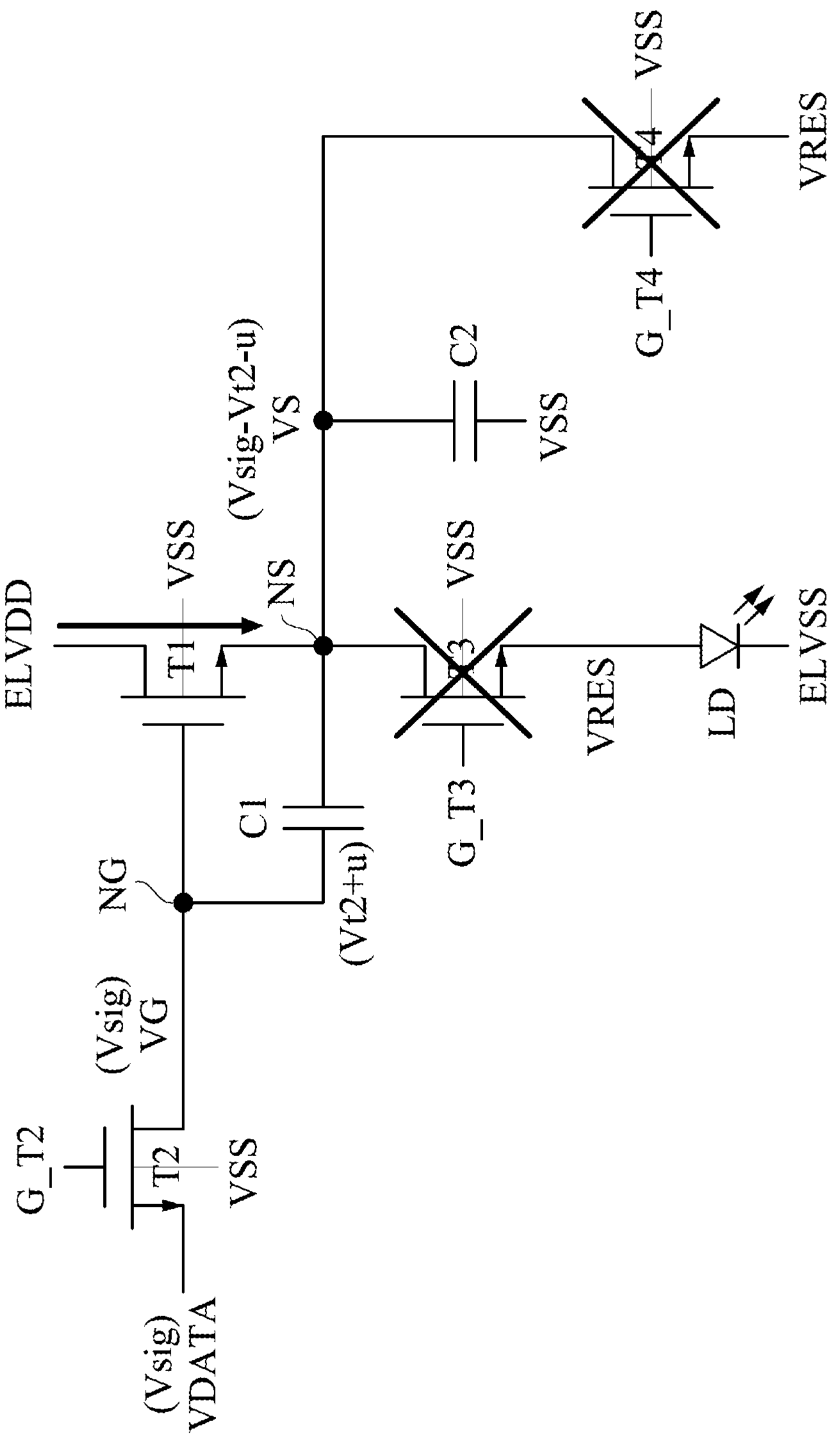
FIG. 4 is a schematic diagram illustrating the pixel circuit in FIG. 1 in a data write and correction duration according to some embodiments of the present disclosure.

References are made to FIG. 2 and FIG. 4. FIG. 4 is a schematic diagram illustrating the pixel circuit 100 in FIG. 1 in the data write and correction duration D3 according to some embodiments of the present disclosure.

As illustrated in FIG. 2 and FIG. 4, in the data write and correction duration D3, the control signal G_T3 and the control signal G_T4 have a low logic value (e.g., a logic value 0), and the control signal G_T2 have the high logic value. Thus, the transistor T3 and the transistor T4 are turned off, and the transistor T2 is turned on. In addition, the data voltage VDATA increases to have a signal voltage Vsig which carries data to be written. In the example of FIG. 2, the signal voltage Vsig is higher than the initial voltage Vini.

As illustrated in FIG. 4, since the transistor T2 is turned on, the signal voltage Vsig is transmitted to the node NG through the turned-on transistor T2 such that the node voltage VG at the node NG increases to the signal voltage Vsig (as shown in FIG. 2). Since the node voltage VG at the node NG increases to the signal voltage Vsig, the signal voltage Vsig is coupled to the node NS through the capacitor C1 due to the coupling of the capacitor C1 such that the node voltage VS at the node NS also increases. The capacitor C2 can be used to hold the node voltage VS at the node NS. Since the node voltage VS at the source terminal of the transistor T1 increases, the threshold voltage of the transistor T1 increases due to the body-effect feature of the transistor T1. As described above, in some embodiments, the ratio of the capacitance value of the capacitor C2 and the capacitance value of the capacitor C1 is greater than the body-effect coefficient of the transistor T1 such that a voltage difference between the node voltage VG at the gate terminal of the transistor T1 and the node voltage VS at the source terminal of the transistor T1 (i.e., a voltage difference between two terminals of the capacitor C1) is greater than the threshold voltage of the transistor T1 in the data write and correction duration D3 (e.g., a threshold voltage Vt2). Thus, the transistor T1 is turned on in the data write and correction duration D3.

In addition, since the transistors T3-T4 are turned off and the transistor T1 is turned on, the power voltage ELVDD can charge the node NS through the turned-on transistor T1 such that the voltage difference between the node voltage VG at the node NG and the node voltage VS at the node NS becomes less. In general, when the voltage difference between the node voltage VG at the node NG and the node voltage VS at the node NS is less than or equal to the threshold voltage Vt2 of the transistor T1, the transistor T1 will be turned off (i.e., enters a steady state).

However, in FIG. 2, before the transistor T1 enters a cut-off state, the control signal G_T2 changes from the high logic value to the low logic value at a time point TP1. In other words, the transistor T2 is turned off earlier before the transistor T1 enters the steady state. At this time, as illustrated in FIG. 4, the node voltage VS at the node NS is charged to a lower voltage derived by following formula (1):

$$VS = \text{Vsig} - Vt2 - u \tag{1}$$

in which when a mobility of the transistor T1 is greater, a mobility correction voltage u is less. On the contrary, when the mobility of the transistor T1 is less, the mobility correction voltage u is greater. The "mobility" of one transistor refers to a moving velocity of carriers (e.g., electrons or electron holes) of the transistor under a specific electrical field.

In other words, since the transistor T2 is turned off earlier, the voltage difference between the node voltage VG (e.g., Vsig) at the node NG and the node voltage VS (e.g., Vsig−Vt2− u) at the node NS is a voltage sum of the threshold voltage Vt2 of the transistor T1 and the mobility correction voltage u. This voltage sum of the threshold voltage Vt2 of the transistor T1 and the mobility correction voltage u is still greater than the threshold voltage Vt2 of the transistor T1. Thus, the transistor T1 is still tuned on. At this time, the capacitor C1 stores charges corresponding to the voltage sum of the threshold voltage Vt2 of the transistor T1 and the mobility correction voltage u. These charges can be used to realize a threshold voltage correction mechanism and a mobility correction mechanism. The details about the threshold voltage correction mechanism and the mobility correction mechanism are described in following paragraphs.

Figure 5:
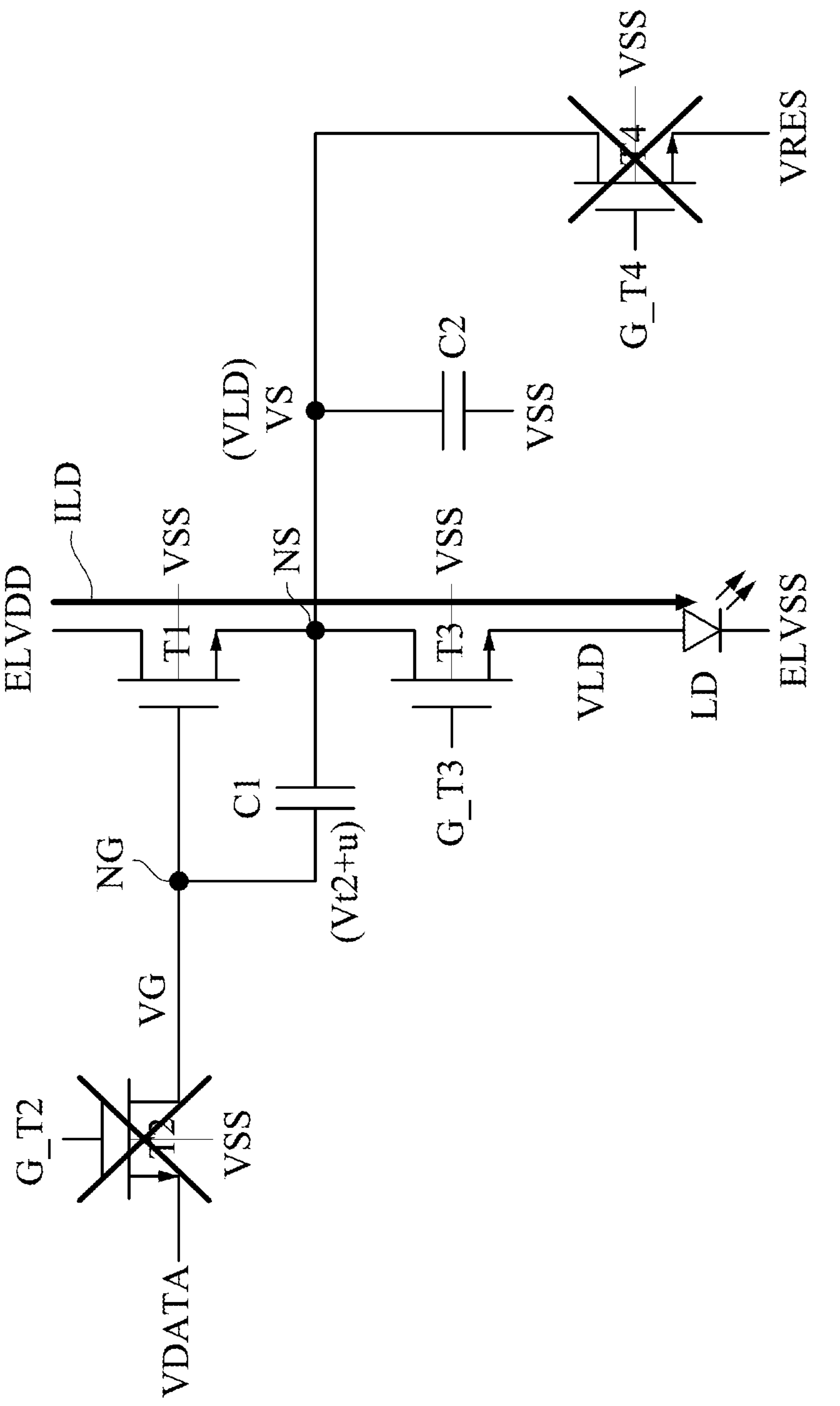
FIG. 5 is a schematic diagram illustrating the pixel circuit in FIG. 1 in a light-emitting duration according to some embodiments of the present disclosure.

References are made to FIG. 2 and FIG. 5. FIG. 5 is a schematic diagram illustrating the pixel circuit 100 in FIG. 1 in the light-emitting duration D4 according to some embodiments of the present disclosure.

As illustrated in FIG. 2 and FIG. 5, in the light-emitting duration D4, the control signal G_T3 has the high logic value, and the control signal G_T4 and the control signal G_T2 have the low logic value. Thus, the transistor T3 is turned on, and the transistor T4 and the transistor T2 are turned off.

As illustrated in FIG. 5, since the transistor T1 is still turned on and the transistor T3 is turned on, the turned-on transistor T1 and the turned-on transistor T3 conducts a light-emitting current ILD to the light-emitting element LD to make the light-emitting element LD emit light. At this time, the node voltage VS at the node NS and the voltage at the anode terminal of the light-emitting element LD have a voltage VLD. In addition, the charges stored in the capacitor C1 still correspond to the voltage sum of the threshold voltage Vt2 of the transistor T1 in the data write and correction duration D3 and the mobility correction voltage u.

Regarding the threshold voltage correction mechanism, as described above, the threshold voltage Vt2 of the transistor T1 in the data write and correction duration D3 is stored in the capacitor C1. Even if the threshold voltage Vt2 of the transistor T1 in the data write and correction duration D3 is different from the threshold voltage of the transistor T1 in the light-emitting duration D4 due to the body-effect feature of the transistor T1, the threshold voltage Vt2 of the transistor T1 in the data write and correction duration D3 stored in the capacitor C1 can be used to cancel the threshold voltage of the transistor T1 in the light-emitting duration D4 to realize the threshold voltage correction mechanism and to control the light-emitting current ILD.

Regarding the mobility correction mechanism, in the data write and correction duration D3, the transistor T2 is turned off earlier at the time point TP1 such that the relationship between the voltage at the gate terminal of the transistor T1 (i.e., the signal voltage Vsig) and the voltage at the source terminal of the transistor T1 (i.e., the node voltage VS) is as formula (1) above. In practical applications, the light-emitting current ILD has a positive relationship to a constant K of the transistor T1 and also has a positive relationship to the mobility correction voltage u of the transistor T1. However, when the mobility of the transistor T1 is greater, the constant K is larger and the mobility correction voltage u is less. On the contrary, when the mobility of the transistor T1 is less, the constant K is less and the mobility correction voltage u is greater. Thus, even if different sub-pixels correspond to different mobility values respectively, the mobility correction mechanism can still be achieved based on the relationship between the constant K and the mobility correction voltage u. In other words, variations between the different light-emitting currents ILD of the different sub-pixels due to their different mobility values can be reduced.

In some related approaches, there is no reset mechanism and the power voltage ELVDD is switched between different voltage values. This causes larger current consumption. In addition, in some related approaches, the threshold voltage correction mechanism and the mobility correction mechanism are performed in different durations and the threshold voltage correction mechanism needs time to settle down. This takes a longer time. Furthermore, some related approaches adopt the Thin-Film Transistor (TFT) process. If the pixel circuit is produced on the Si process, the enhanced mobility and additional body-effect features reduce the data range and make the compensation effect less than expected.

Compared to the aforementioned related approaches, in the present disclosure, there is the reset duration D1 and the power voltage ELVDD is the fixed voltage. Thus, the present disclosure can cause less current consumption. In addition, the threshold voltage correction mechanism and the mobility correction mechanism are performed in the same duration (e.g., the data write and correction duration D3) and the transistor T2 is turned off earlier such that the node voltage VS at the node NS is charged to the lower voltage derived by formula (1) above. Thus, the present disclosure can shorten the operation cycle to achieve a higher resolution and a higher frame rate. Furthermore, the present disclosure utilizes the body-effect features to enlarge the narrower data range of the data voltage VDATA on the Si process.

In some embodiments, the reference voltage VSS can be designed to be different from the reset voltage VRES. In some other embodiments, the reference voltage VSS can be designed to be equal to the reset voltage VRES. Thus, terminals receiving the reference voltage VSS and the reset voltage VRES can be coupled together by same routing wires to reduce the number of the routing wires.

Figure 6:
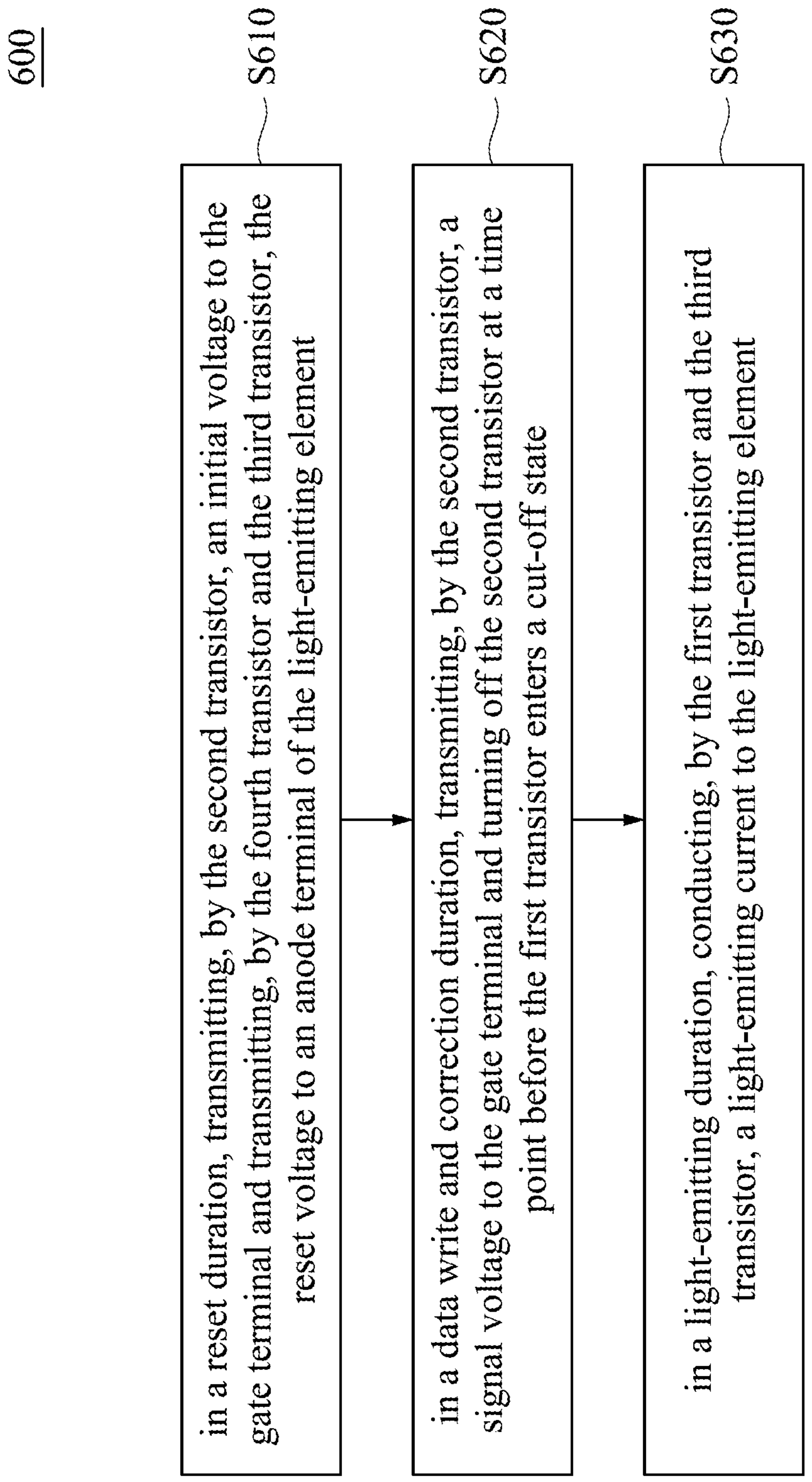
FIG. 6 is a schematic diagram illustrating an operation method of a pixel circuit according to some embodiments of the present disclosure.

Reference is made to FIG. 6. FIG. 6 is a schematic diagram illustrating an operation method 600 of a pixel circuit according to some embodiments of the present disclosure.

As illustrated in FIG. 6, the operation method 600 includes operation S610, operation S620, and operation S630.

In some embodiments, the operation method 600 can be applied to the pixel circuit 100 in FIG. 1, but the present disclosure is not limited thereto. For better understanding, the operation method 600 is described with reference to the pixel circuit 100 in following paragraphs.

In operation S610, as illustrated in FIG. 3, in the reset duration D1, the turned-on transistor T2 transmits the initial voltage Vini to the gate terminal of the transistor T1, and the turned-on transistor T4 and the turned-on transistor T3 transmit the reset voltage VRES to the anode terminal of the light-emitting element LD.

In operation S620, as illustrated in FIG. 4, in the data write and correction duration D3, the turned-on transistor T2 transmits the signal voltage Vsig to the gate terminal of the transistor T1, and then the transistor T2 is turned off at the time point TP1 before the transistor T1 enters the cut-off state such that the node voltage VS at the node NS is charged to the lower voltage derived by formula (1) above.

In operation S630, as illustrated in FIG. 5, the turned-on transistor T1 and the turned-on transistor T3 conduct the light-emitting current ILD to the light-emitting element LD to make this sub-pixel emit light.

The details about operation S610, operation S620, and operation S630 are described in paragraphs related to the aforementioned embodiments, so they are not described herein again.

Based on the descriptions above, the present disclosure can cause less current consumption, shorten the operation cycle to achieve the higher resolution and the higher frame rate, and utilize the body-effect features to enlarge the data range.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A pixel circuit, comprising:

a first transistor configured to receive a power voltage;

a second transistor configured to receive a data voltage and coupled to a gate terminal of the first transistor;

a first capacitor coupled between the gate terminal of the first transistor and a source terminal of the first transistor;

a third transistor coupled between the source terminal of the first transistor and a light-emitting element;

a second capacitor coupled between the source terminal of the first transistor and a reference voltage; and a fourth transistor coupled between the source terminal of the first transistor and a reset voltage, wherein in a reset duration, the third transistor is turned on.

2. The pixel circuit of claim 1, wherein the power voltage is a fixed voltage.

3. The pixel circuit of claim 1, wherein a bulk terminal of the first transistor is configured to receive the reference voltage.

4. The pixel circuit of claim 3, wherein the reference voltage is equal to the reset voltage.

5. The pixel circuit of claim 1, wherein in the reset duration, the data voltage has an initial voltage, wherein in a data write and correction duration, the data voltage has a signal voltage higher than the initial voltage.

6. The pixel circuit of claim 1, wherein in the reset duration, the second transistor, the third transistor, and the fourth transistor are turned on.

7. The pixel circuit of claim 1, wherein in a data write and correction duration, the second transistor is turned on, and the third transistor and the fourth transistor are turned off.

8. The pixel circuit of claim 7, wherein the second transistor is turned off at a time point before the first transistor enters a cut-off state such that a voltage difference between two terminals of the first capacitor is equal to a voltage sum of a threshold voltage of the first transistor in the data write and correction duration and a mobility correction voltage.

9. The pixel circuit of claim 1, wherein in a light-emitting duration, the third transistor is turned on, and the second transistor and the fourth transistor are turned off.

10. The pixel circuit of claim 1, wherein the light-emitting element is implemented by a light emitting diode on silicon or an organic light emitting diode on silicon.

11. An operation method of a pixel circuit of claim 1, wherein the operation method comprises:

in the reset duration, transmitting, by the second transistor, an initial voltage to the gate terminal of the first transistor and transmitting, by the fourth transistor and the third transistor, the reset voltage to an anode terminal of the light-emitting element;

in a data write and correction duration, transmitting, by the second transistor, a signal voltage to the gate terminal of the first transistor and turning off the second transistor at a time point before the first transistor enters a cut-off state; and in a light-emitting duration, conducting, by the first transistor and the third transistor, a light-emitting current to the light-emitting element.

12. The operation method of claim 11, wherein the power voltage is a fixed voltage.

13. The operation method of claim 11, wherein a bulk terminal of the first transistor is configured to receive the reference voltage.

14. The operation method of claim 13, wherein the reference voltage is equal to the reset voltage.

15. The operation method of claim 11, wherein in the reset duration, the data voltage has the initial voltage, wherein in the data write and correction duration, the data voltage has the signal voltage higher than the initial voltage.

16. The operation method of claim 11, further comprising:

in the reset duration, turning on the second transistor, the third transistor, and the fourth transistor.

17. The operation method of claim 11, further comprising:

in the data write and correction duration, turning on the second transistor, and turning off the third transistor and the fourth transistor.

18. The operation method of claim 17, wherein the second transistor is turned off at the time point such that a voltage difference between two terminals of the first capacitor is equal to a voltage sum of a threshold voltage of the first transistor in the data write and correction duration and a mobility correction voltage.

19. The operation method of claim 11, further comprising:

in the light-emitting duration, turning on the third transistor, and turning off the second transistor and the fourth transistor.

20. The operation method of claim 11, wherein the light-emitting element is implemented by a light emitting diode on silicon or an organic light emitting diode on silicon.

* * * * *